US011047829B2

(12) United States Patent
Ducousso et al.

(10) Patent No.: US 11,047,829 B2
(45) Date of Patent: Jun. 29, 2021

(54) METHOD FOR NONDESTRUCTIVE INSPECTION BY ULTRASOUND OF A BONDED ASSEMBLY

(71) Applicant: SAFRAN, Paris (FR)

(72) Inventors: Mathieu Loïc Ducousso, Moissy-Cramayel (FR); Nicolas Cuvillier, Moissy-Cramayel (FR)

(73) Assignee: SAFRAN, Paris (FR)

( * ) Notice: Subject to any disclaimer, the term of this patent is extended or adjusted under 35 U.S.C. 154(b) by 176 days.

(21) Appl. No.: 16/343,893

(22) PCT Filed: Oct. 24, 2017

(86) PCT No.: PCT/FR2017/052926
§ 371 (c)(1),
(2) Date: Apr. 24, 2019

(87) PCT Pub. No.: WO2018/078272
PCT Pub. Date: May 3, 2018

(65) Prior Publication Data
US 2019/0271665 A1 Sep. 5, 2019

(30) Foreign Application Priority Data
Oct. 25, 2016 (FR) ...................................... 1660355

(51) Int. Cl.
*G01N 29/04* (2006.01)
*G01N 29/30* (2006.01)
(Continued)

(52) U.S. Cl.
CPC ......... *G01N 29/041* (2013.01); *G01N 29/262* (2013.01); *G01N 29/30* (2013.01); *G01N 29/4409* (2013.01); *G01N 29/4472* (2013.01); *G01N 29/46* (2013.01); *G01N 29/52* (2013.01); *G01N 2291/0231* (2013.01);
(Continued)

(58) Field of Classification Search
CPC .... G01N 29/041; G01N 29/46; G01N 29/262; G01N 29/30; G01N 29/4409; G01N 29/4472; G01N 29/52; G01N 2291/2694; G01N 2291/106; G01N 2291/2632;
(Continued)

(56) References Cited

U.S. PATENT DOCUMENTS 8,087,298 B1 * 1/2012 DiMambro .......... G01N 29/226
73/629
2018/0340858 A1 * 11/2018 Jahanbin ............ G01N 29/4427

OTHER PUBLICATIONS

International Search Report dated Feb. 2, 2018, issued in corresponding International Application No. PCT/FR2017/052926, filed Oct. 24, 2017, 2 pages.
(Continued)

*Primary Examiner* — Suman K Nath
(74) *Attorney, Agent, or Firm* — Christensen O'Connor Johnson Kindness PLLC

(57) ABSTRACT

A method for nondestructive inspection by ultrasound of a bonded assembly is provided. The method comprises two steps, consisting of measuring a thickness of an adhesive joint of the bonded assembly by an ultrasound transducer arranged on the bonded assembly in a determined position, and measuring the degree of adhesion of parts of the bonded assembly by the same ultrasound transducer maintained in the determined position, the degree of adhesion being measured by ZGV Lamb waves.

5 Claims, 1 Drawing Sheet

(51) Int. Cl.
  G01N 29/44    (2006.01)
  G01N 29/52    (2006.01)
  G01N 29/46    (2006.01)
  G01N 29/26    (2006.01)
(52) U.S. Cl.
  CPC .............. G01N 2291/02854 (2013.01); G01N 2291/0427 (2013.01); G01N 2291/106 (2013.01); G01N 2291/2632 (2013.01); G01N 2291/2694 (2013.01)
(58) Field of Classification Search
  CPC . G01N 2291/0231; G01N 2291/02854; G01N 2291/0427
  See application file for complete search history.

(56) References Cited

OTHER PUBLICATIONS

Written Opinion of the International Searching Authority dated Feb. 2, 2018, issued in corresponding International Application No. PCT/FR2017/052926, filed Oct. 24, 2017, 7 pages.
Cho, H., et al., "Evaluation of the Thickness and Bond Quality of Three-Layered Media using Zero-Group-Velocity Lamb Waves," Journal of Physics: Conference Series vol. 520, Jun. 2014, 5 pages.
Geslain, A., et al., "Spatial Laplace transform for complex wavenumber recovery and its application to the analysis of attenuation in acoustic systems," Journal of Applied Physics vol. 120, Oct. 2016, 8 pages.
Prada, C. et al., "Remarkable properties of Lamb modes in plates," Women in Applied Mathematics, May 2011, 45 pages.
Clorennec, D., et al., "Laser Generation and Detection of Zero-group Velocity Lamb Modes for Plate and Adhesive Disbond Characterization," 1st International Symposium on Laser Ultrasonics: Science, Technology and Applications, Jul. 2008, 7 pages.
Wu, T-T., and Liu, Y-H., "Inverse determinations of thickness and elastic properties of a bonding layer using laser-generated surface waves," Ultrasonics 37(1):23-30, Jan. 1999.
Written Opinion of the International Searching Authority dated Feb. 2, 2018, issued in corresponding International Application No. PCT/FR2017/052926, filed Oct. 24, 2017, 8 pages.
Written Opinion of the International Searching Authority dated Apr. 30, 2019, issued in corresponding International Application No. PCT/FR2017/052926, filed Oct. 24, 2017, 1 page.

* cited by examiner

METHOD FOR NONDESTRUCTIVE INSPECTION BY ULTRASOUND OF A BONDED ASSEMBLY

TECHNICAL FIELD

The present invention relates to a method for nondestructive inspection (NDI) of an anisotropic multi-layer composite-type medium, and in particular a quantitative method for inspecting the degree of adhesion of an adhesively bonded joint of a bonded assembly intended to resist a mechanical force.

STATE OF THE ART

Composite materials have many advantages with respect to metallic materials conventionally used in the aeronautical field. Among the advantages of these composite materials, mention may be made of the large stiffness/mass ratio thereof, the good resistance to fatigue and corrosion thereof, and the good adaptability of the mechanical properties thereof to the specific loads applied to them during use.

Therefore, the use of composite materials makes it possible to consequently reduce the weight of structures. For example, in civil aviation, the use of composite materials enables a 20% reduction in the mass of parts for the same or even higher structural stiffness. This induces a saving estimated at 6% of the total mass of the aircraft, resulting in high fuel savings.

However, due to the intrinsic characteristics thereof, composite materials do not easily support bolting or riveting and cannot be welded. Therefore, they have to be assembled by adhesive bonding. It must be possible to regularly and reliably inspect these structures to satisfy safety standards, with a diagnostic such that the mechanical behaviour of the glued assembly can be quantified. In this context, there are difficulties in quickly evaluating the state of a structure assembled by adhesive bonding; some elements have to be partially disassembled to access the internal structures, thus making it necessary to immobilise an inspected aircraft in the workshop. Although there are many nondestructive evaluation methods, the simplest no doubt being a visual inspection, existing conventional methods do not make it possible for a real quantification of the mechanical strength of a bonded assembly.

In the absence of an appropriate method of quantitatively inspecting the quality of adhesive bonding, it is difficult (even impossible) to measure the degree of adhesion of these assembled structures and thus to inspect, prove and guarantee the quality and reliability thereof. This prevents a generalisation of bonding techniques as an assembly means and therefore a generalisation of the use of structural parts made of composite materials in the aeronautical industry.

In order to overcome this disadvantage, NDT techniques using ultrasound waves have been studied for several years, for example as in documents Cho H. et al.: "Evaluation of the Thickness and Bond Quality of Three-Layered Media using Zero-Group-Velocity Lamb Waves", or Geslain A. et al.: "Spatial Laplace transform for complex wavenumber recovery and its application to the analysis of attenuation in acoustic systems". These mechanical waves would be the best suited for inspecting mechanical strength (or degree of bond). In recent years, studies have focused in particular on one category of ultrasound waves, namely zero group velocity Lamb waves (ZGV Lamb waves).

In a medium with finite thickness (in the case, for example, of a plate in a vacuum), two surface waves can propagate without interaction on each of the free interfaces provided that the plate thickness is large compared with the wave length $\lambda$ of the surface wave. When the thickness of the plate is of the same order of magnitude as $\lambda$, other waves appear resulting from coupling of different partial waves at solid/vacuum interfaces of the plate. These plate waves, Lamb waves, are dispersive and they have the special property of creating a movement field throughout the entire thickness of the structure.

The term leaky Lamb wave refers to a specific case of Lamb waves that propagate in the structure from the place in which they are generated; this is unlike zero group velocity (ZGV) Lamb waves for which the acoustic energy remains confined under the location of the acoustic generation.

Conventionally and in a manner known per se, the study of the propagation of Lamb waves requires the calculation of dispersion curves that can be represented by phase velocity profiles as a function of a frequency-thickness product.

Nondestructive inspection of plates and adhesively bonded tube assemblies can thus be made using leaky Lamb waves propagating in the studied medium. In a manner known per se, for a given material, there is a set of resonances of ZGV Lamb waves and the detection thereof provides an absolute and local measurement of Poisson's ratio. These non-propagative modes can also be used to characterise multilayer structures.

DESCRIPTION OF THE INVENTION

This application proposes a new method for quantitative nondestructive inspection of adhesive bonding using, in particular, leaky Lamb waves or ZGV Lamb waves.

Thus, the purpose of the present invention is a nondestructive method for inspecting an adhesively bonded assembly by ultrasound, characterised in that it comprises steps consisting of:

measuring a thickness of a bonded joint of the bonded assembly using an ultrasound transducer placed in a determined position on the adhesively bonded assembly, measuring the degree of adhesion of parts of the bonded assembly using the same ultrasound transducer held in said determined position, the degree of adhesion being measured by ZGV Lamb waves, and in that the at least one emitting element of the transducer is used to emit ZGV Lamb waves in the adhesively bonded joint and is spatially positioned so as to create a periodic spatial comb, of which the at least one emitting element changes position during each acquisition, and wherein at least one other element of the transducer is used to acquire the emitted ZGV Lamb waves.

This method can thus make it possible for a single transducer to measure the thickness of the adhesively bonded joint in the bonded assembly and to quantify the mechanical strength thereof (degree of adhesion). These two parameters are essential to guarantee the good design of a bonded assembly. To achieve this, the method proposes an innovative use of the transducer; the mechanical strength (degree of adhesion) of the bonded assembly by ZGV Lamb waves can be characterised provided that the thicknesses considered in the bonded assembly are known, in particular the thickness of the adhesively bonded joint. Yet, the first step in the method consists of taking a precise measurement of this thickness. Therefore, using the transducer in this manner makes it possible to take two successive measurements without touching the experimental device. The inspection can then be carried out quickly and easily in an industrial environment.

The method according to the invention may comprise one or more of the following characteristics, taken individually or in combination with each other:

the method can measure the thicknesses of the different layers of the bonded structure by means of an ultrasound transducer placed on the bonded assembly in a determined position, the ultrasound transducer is a multi-element transducer, the joint thickness is measured using a method of measuring the acoustic flight time in reflection, the acquisition is made in the temporal and spatial domain, so as to obtain dispersion curves intended to be compared with a simulation model that models parameters of the degree of adhesion or with a monogram of dispersion curves considering the thicknesses of the assembly and quantification of the mechanical bonding strength, this comparison being usable to quantify the mechanical strength of the bonded assembly, dispersion curves are obtained by inversion of detected waves using a Bi-FFT approach or a singular-value decomposition (SVD) method, ZGV Lamb waves are acquired in particular in the time domain, so as to obtain a B-scan type image of the ultrasound signal of ZGV Lamb waves, dispersion curves of ZGV lamb waves associated with the recorded B-Scans are obtained either by simple BI-FFF of the B-scan or by a so-called singular-value decomposition (SVD) approach, the dispersion curves thus obtained are intended to be compared with a simulation model capable of modeling parameters of the degree of adhesion, and several sliding combs are created successively to generate different ZGV modes successively, the parameters of each degree of adhesion thus measured being used to superpose the simulations on experiments and thus measure the degree of adhesion of the adhesively bonded joint.

DESCRIPTION OF THE FIGURES

The invention will be best understood, and other characteristics and advantages of the invention will become clearer upon reading the following description made as a non-limiting example and in reference to the appended drawings, wherein.

DETAILED DESCRIPTION

Figure 1:
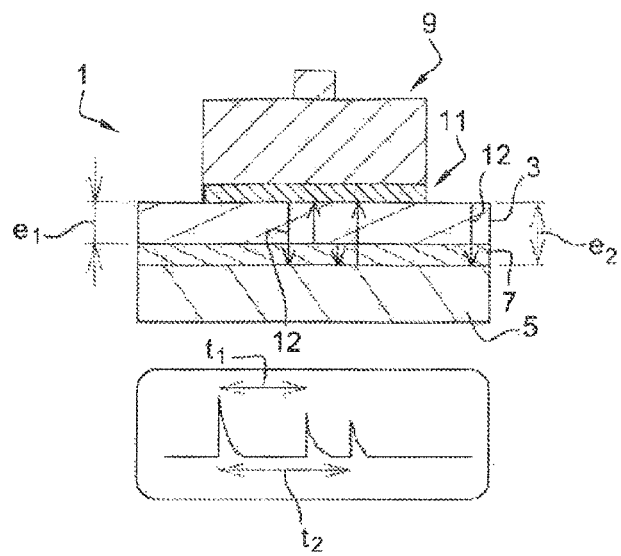
FIG. 1 is a diagram illustrating the procedure in the first step of a method according to the invention performed using a method of measuring the acoustic flight time in reflection.

FIG. 1 is now referred to. It shows a sample of an adhesively bonded assembly 1 on which the first step of the described method is used. The adhesively bonded assembly 1 is an assembly composed of a first layer 3 composed of a first composite material and a second layer 5 that may or may not be composed of a second composite material, assembled together by an adhesive joint 7.

An ultrasound device 9 is placed in contact with the sample of the adhesively bonded assembly 1. The ultrasound device 9 in the illustrated example is a multi-element ultrasound 11 transducer 9 functioning in contact. The intrinsic characteristics of the transducer 9 (flat or flexible, number of elements 11, dimensions, central frequency, etc.) can differ according to the bonded assembly 1 considered to optimise the generation/detection of the physical phenomena involved, and particular the emission and acquisition of an emitted ultrasound signal 12. The entire method is performed by using a single transducer 9 with multiple elements 11 in contact with the bonded assembly 1. This transducer 9 is used for the entire method (the two steps) and is not moved before the end of the method.

The first step of the method measures the thickness of the adhesively bonded joint 7 of the bonded assembly 1 using emission and acquisition of an ultrasound signal 12. This first step is performed using a conventional pulse/echo method with a flight time measurement.

FIG. 1 illustrates this step. It consists of taking an acoustic flight time measurement in reflection, t1, t2. This approach is well described in COSAC UT procedures. It consists of measuring the time t1, t2 necessary for a forward/return acoustic path and, knowing the acoustic velocity in the materials 3, 5, 7 through which it passes, it is easy to quantify the thicknesses e1, e2 of the materials 3, 5, 7 under the transducer 9. This method is applicable to a transducer 9 with multiple elements 11.

Figure 2:
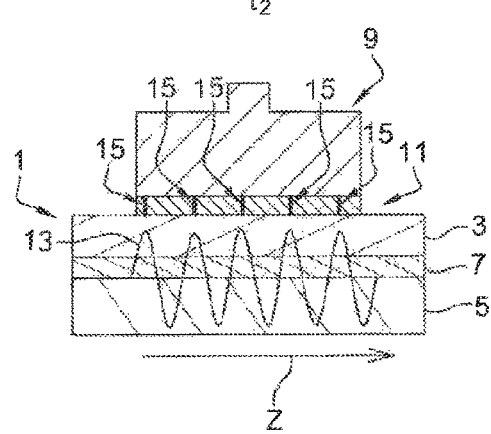
FIG. 2 is a diagram illustrating the procedure in the second step of a method according to the invention.
Figure 3:
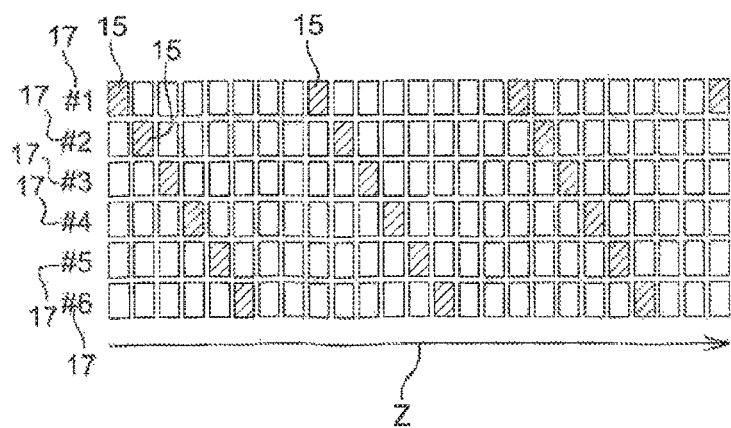
FIG. 3 is an acquisition diagram with a sliding comb necessary to obtain dispersion curves to observe the ZGV Lamb wave modes considered.

FIGS. 2 and 3 illustrate the operation of the second step of the method. This second step is a measurement of adhesion using ZGV Lamb waves 13. ZGV Lamb waves 13 are ultrasound resonances of structures and remain confined under the excitation source. Therefore, the energy of these waves 13 is only very slightly dissipated and these waves 13 have a long lifespan and strong interaction with the material. As mentioned above, it has been demonstrated that these waves 13 can make it possible to survey the quality of an adhesively bonded assembly 1 provided that the characteristic thicknesses of the different layers of the adhesively bonded assembly 1 are known. Therefore the thickness of the adhesively bonded joint 7 must be known. This thickness is known, due to the first step in the method.

These waves 13 are difficult to emit/detect and to date, the only way of detecting them is to use ultrasound-laser. Thus, to generate ZGV Lamb modes 13 in the bonded assembly 1, the method uses the same transducer 9 with multiple elements 11 as used to perform the first step in the method. The second step in the method is performed just after the measurement of the thickness of the adhesively bonded joint 7 and the transducer 9 has not been affected or moved between the two steps in the method.

Some of the elements 11 of the transducer 9 are used as emitting elements 15 and the other elements 11 are used in reception mode.

To optimise the generation of ZGV Lamb modes 13, the elements 15 of the transducer 9 working in emission mode are spatially positioned such that they create a spatially periodic excitation (along the axis Z parallel to the different layers of materials 3, 5, 7 of the bonded assembly 1), as illustrated on FIGS. 2 and 3. This spatially periodic excitation along Z is called a "spatial generation comb".

The comb period is selected to correspond to the wavelength of the desired ZGV mode of the ZGV Lamb waves 13. Therefore, the emitting elements 15 of the transducer 9 have a comb-shaped spatial distribution distributed over the entire surface of the transducer 9. The other elements 11 of the transducer 9 with multiple elements 11 operate in reception mode and record a signal resolved in time.

The acquisition 17 is made in the temporal domain for each element 11 and makes it possible to obtain an image in B-Scan mode of the propagation of the ultrasound signal 19. A mathematical transformation in reciprocal space (ultrasound wavelength and frequencies) is then made to obtain dispersion curves of ZGV Lamb waves 13 emitted by the emitting element 15. The transformation is preferably made using a mathematical SVD (Singular Value Decomposition) approach but it can also be made using a simple mathematical approach called Bi-FFT. To make inversion possible by using an SVD approach, the comb must be sliding as shown in FIG. 5, i.e. the emitting elements 15 change position during each acquisition 17. The emitting element 15 is shown in cross-hatched lines for each emission/acquisition 17, while the receiving elements 11 are shown in white.

Dispersion curves are obtained in the same manner as during the first step, by making an inverse transformation of the signal 13, using a Bi-FFT or SVD mathematical approach. To make inversion possible by using an SVD approach, the comb must be sliding, as illustrated in FIG. 3, i.e. the emitting elements 15 change position during each acquisition 17.

The dispersion curves for ZGV Lamb modes 13 are then interpreted in comparison with a simulation model wherein an interface stiffness (degree of adhesion) is modeled. Several different combs can be created successively to generate different ZGV modes successively.

The interface stiffness parameters are used to superpose simulations on experiments and thus measure these degrees of adhesion that comprise a signature of the quality of the bond made and therefore the reliability of the adhesively bonded joint 7 and therefore of the bonded assembly 1.

The invention claimed is:

1. A nondestructive method for inspection by ultrasound of an adhesively bonded assembly, comprising:

a first step of measuring a thickness of a bonded joint of the adhesively bonded assembly using an ultrasound transducer placed in a determined position on the bonded assembly;

and a second step of measuring the degree of adhesion of parts of the bonded assembly using the ultrasound transducer held in said determined position, the degree of adhesion being measured by ZGV Lamb waves and using the thickness measured in the first step, wherein the ultrasound transducer is a multi-element transducer, and wherein at least one emitting element of the multi-element transducer is used to emit ZGV Lamb waves in the adhesively bonded joint and is spatially positioned so as to create a periodic spatial comb, of which the at least one emitting element changes position during each acquisition, and wherein at least one other element of the multi-element transducer is used to acquire the emitted ZGV Lamb waves.

2. The method according to claim 1, wherein the thickness of the adhesive joint is measured by measuring the acoustic flight time in reflection.

3. The method according to claim 1, wherein the acquisition is made in the temporal and spatial domain so as to obtain dispersion curves intended to be compared with a simulation model that models parameters of the degree of adhesion or with a monogram of dispersion curves.

4. The method according to claim 3, wherein the dispersion curves are obtained by inversion of detected waves according to a Bi-FFT approach or a singular-value decomposition (SVD) method.

5. The method according to claim 4, wherein several sliding combs are created successively to generate different ZGV modes successively, the parameters of each degree of adhesion thus measured being used to superpose the simulations on experiments and thus measure the degree of adhesion of the adhesively bonded joint.

* * * * *